Dec. 21, 1965  R. A. LEFEVER  3,224,840
METHODS AND APPARATUS FOR PRODUCING CRYSTALLINE MATERIALS
Filed Nov. 16, 1962
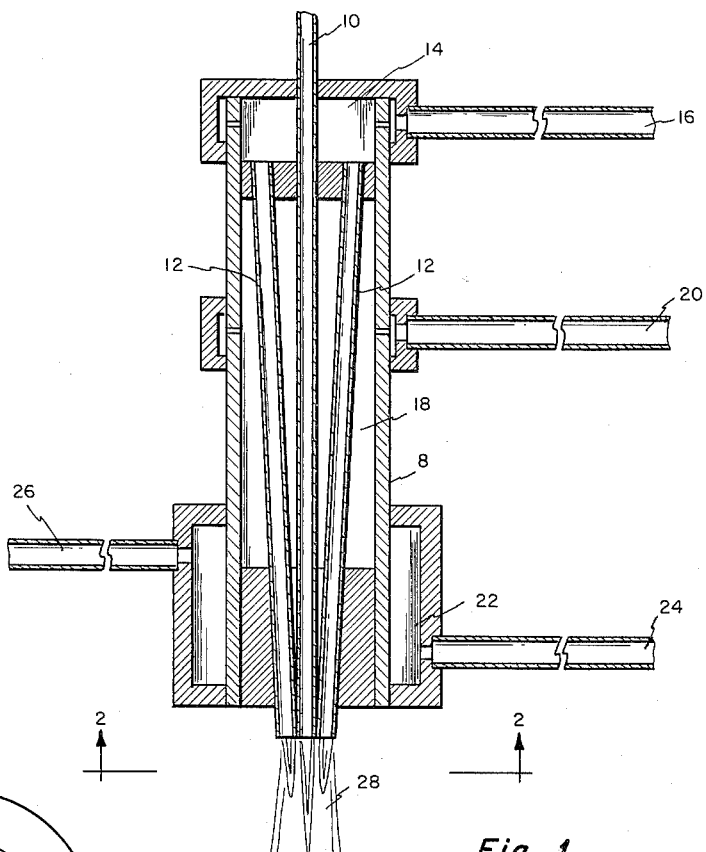
Fig. 1.
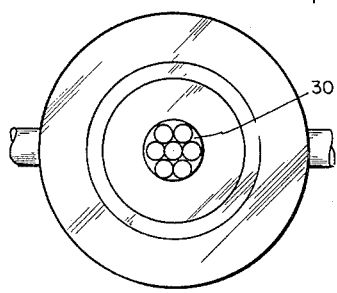
Fig. 2.
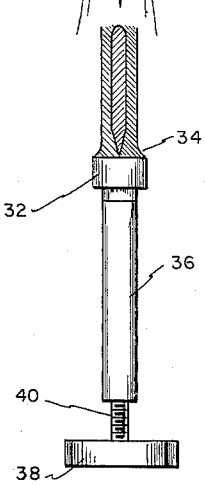
INVENTOR.
ROBERT A. LEFEVER
BY
R. J. Frank
ATTORNEY.

__United States Patent Office__

3,224,840
Patented Dec. 21, 1965

3,224,840
METHODS AND APPARATUS FOR PRODUCING
CRYSTALLINE MATERIALS
Robert A. Lefever, Palo Alto, Calif., assignor to General
Telephone and Electronics Laboratories, Inc., a corporation of Delaware
Filed Nov. 16, 1962, Ser. No. 238,301
3 Claims. (Cl. 23—273)

My invention is directed toward methods and apparatus for producing crystalline materials and more particularly relates to a flame fusion process for producing crystals in the form of oxides.

In the flame fusion process, crystals are prepared by controlled melting and recrystallization of an oxide. More particularly, the process normally employs several vertical concentric tubes through which reactant gases (normally oxygen and hydrogen) are individually fed to the bottom of the tubes where the gases are mixed and ignited to produce a "soft" laminar flame exhibiting concentric combustion zones. The raw material for crystal growth in the form of powders of the oxide constituents is sifted through the flame to fall on the molten cap of a growing crystal supported on a pedestal within the flame. As the powders are added, the pedestal is lowered and a crystalline boule is formed.

However, flame fusion grown crystals of certain materials normally crack extensively on cooling, and the fragments so produced, while satisfactory for some purposes, are in many respects unsatisfactory, particularly when large crystal boules are required for such applications as masers, optical masers and the like.

It is an object of my invention to improve the flame fusion process in such a manner as to prevent cracking.

Another object is to provide new and improved apparatus for producing crystalline materials by a flame fusion process.

Still another object is to provide new and improved apparatus for producing large crystalline boules by a flame fusion process in such a manner that the boules will not crack on cooling.

These and other objects of my invention will either be explained or will become apparent hereinafter.

In accordance with the principles of my invention, the flame producing apparatus is modified in such a manner as to provide improved gas mixing and focusing of the flame, thereby providing greater energy input per unit area of the molten surface of the crystalline material being formed, thus increasing the temperature attainable during growth. In addition, the temperature gradients existing across the diameter of the flame are reduced, thus minimizing the formation of internal stresses and strains in the resultant boule.

In using this apparatus, the crystalline materials are grown in such a manner as to continuously form a sintered-powder coating about the crystal boule during growth, and large single crystal boules or even large polycrystalline boules (for example of C-type rare earth oxides and stoichiometric spinel) can be formed and recovered uncracked.

Illustrative embodiments of my invention will now be described both with reference to the specific examples which follow and to the accompanying drawings wherein FIG. 1 is a vertical view in cross section of my apparatus; and FIG. 2 is a bottom plan view of my apparatus.

Referring now to FIGS. 1 and 2, there is shown a hollow housing 8, containing a vertical inner hollow tube 10 surrounded by a plurality of spaced apart hollow tubes 12 which are inclined from the vertical whereby tubes 12 are more closely spaced at the bottom rather than at the top of housing 8. Inclining the tubes focuses the flame, increasing the attainable melt temperature.

Tubes 12 terminate at the bottom of an upper hollow section 14 in housing 8 while tube 10 extends completely through the section. In normal operation, hydrogen gas is fed into section 14 by way of a first inlet pipe 16 and oxygen gas is fed into a lower hollow section 18 by way of a second inlet pipe 20. In an alternative method of operation, oxygen gas is fed into section 14 and hydrogen gas is fed into section 18.

The lower portion of a housing 8 is surrounded by a hollow cooling jacket 22 to which cooling water is fed by way of a third inlet pipe 24, the water being circulated through the jacket and being removed by way of outlet pipe 26.

The flame 28 is produced at the bottom of the housing 8. In normal operation, oxygen gas (referred to hereinafter as inner oxygen) together with the mixed powders is fed downward through tube 10 and mixes in the region of the flame with the hydrogen being discharged through the bottom of tubes 12. Additional oxygen gas (referred to hereinafter as outer oxygen) is supplied from the hollow section 18 through the interstices 30 between tubes 12.

A pedestal 32 is positioned within the tip of the flame and receives the molten powders, pedestal 32 being lowered (and rotated) as a growing boule is formed. For example, the pedestal 32 may be affixed to the top end of internally threaded rod 36 which in turn is rotatably mounted on a mated vertical threaded shaft 40. Shaft 40 is maintained in a vertical position by base member 38 secured to the lower end thereof. The rotation of rod 36 (by hand or otherwise) results in the rotation and lowering of pedestal 32 and the crystalline boule thereon.

In accordance with my process, a sintered broad based cone 34 is placed on the pedestal prior to the initiation of growth by operating the powder feed and adjusting the burner to maintain a temperature just under the melting point of the powder. The finely-divided oxide powder is fed downward through tube 10, the initial crystal formation being initiated at the tip of the cone by gradually increasing the flame temperature. Hence, a thick powder layer continually accumulates about the molten central region during growth.

As a result, large single crystals and polycrystalline boules of C-type rare earth oxides or stoichiometric spinel have been grown without subsequent cracking, a result hitherto unobtainable.

EXAMPLE I 9.242 grams of $Y_2O_3$ powder and 0.758 grams of $Eu_2O_3$ powder (comprising a powder containing 5 mole percent $Eu_2O_3$) were mechanically mixed and placed in the powder feed hopper. Feed gases were supplied to the burner and ignited. The ceramic pedestal was positioned approximately 1″ below the end of the burner. Powder was then deposited on the pedestal by periodically tapping the feed mechanism and by adjusting the flame temperature to provide sintering. After a sintered cone of powder (about ½″ in diameter at the base and ⅜″ high) was deposited on the pedestal, the flame temperature was gradually increased until a small molten tip resulted. The molten region was held at a fixed position with respect to the end of the burner by lowering the pedestal at a rate approximating the linear growth rate of the crystal.

The diameter of the crystal was increased by gradually increasing the flame temperature. A very slow rate of diameter increase was maintained in order to insure the continual accumulation of sintered powder around the crystal. After the desired diameter of approximately ¼″ was attained, growth was continued under fixed conditions until the desired crystal length was obtained.

Typical conditions during growth were gas flow rates (at a pressure of 15 pounds per square inch) of 9–15 cubic feet per hour (CFH) inner oxygen, 2–3 CFH outer oxygen, 55–65 CFH hydrogen, and a linear growth rate about 0.5–2 centimeters per hour. A single crystal of europium-doped yttrium oxide was produced in this manner, the europium being present in an amount equal to 5 mole percent of host material. The crystals were about ¼" in diameter and had a length ranging upward from about 1". Single crystal and polycrystalline boules of yttrium oxide containing other rare earth doping ions and of ytterbium oxide, erbium oxide, and praseodymium oxide were also grown in the manner set forth above. These crystals did not crack upon cooling. It is my belief that the elimination of cracking is produced by elimination of internal stresses and strains. More particularly these stresses and strains are probably produced by thermal gradients. The thick layer of porous sintered powder surrounding the molten crystal probably reduces thermal radiation which in turn decreases the axial and radial thermal gradients during growth. In addition a more uniform temperature reduction probably occurs as the crystal cools after termination of growth.

EXAMPLE II 14.33 grams of $Al_2O_3$ and 5.67 grams of MgO, both in powder form (comprising a powder containing equal molar amounts of $Al_2O_3$ and MgO) were mechanically mixed and placed in the powder hopper. Feed gases were supplied to the burner and ignited. A ceramic pedestal was positioned approximately 2" below the end of the burner. Powder was then deposited on the pedestal by periodic tapping of the feed mechanism and by adjusting the flame temperature to provide sintering. After a sintered powder cone was deposited on the pedestal, the flame temperature was gradually increased until a small molten tip resulted. Using the growth steps outlined in Example I, the crystal was gradually enlarged in diameter and length, while continuing to maintain a coating of sintered powder around the crystal.

Typical conditions during growth were gas flow rates (at a pressure of 15 pounds per square inch) of 3–5 CFH inner oxygen, 4–5 CFH outer oxygen, 28–30 CFH hydrogen and a linear growth rate of 0.5–2 centimeters per hour.

While I have pointed out my invention as applied above, it will be obvious to those skilled in the art that many modifications can be made in the scope and sphere of my invention.

What is claimed is:

1. Apparatus for flame fusion crystal growth wherein a crystal is grown on a surface by subjecting the constituents of the crystal deposited thereon to a high temperature flame, said apparatus comprising
    (a) a first vertically extending cylindrical tube adapted to permit the downward passage of oxygen gas therethrough;
    (b) a plurality of cylindrical tubes, said tubes being distributed around said first tube at equidistantly spaced positions relative thereto and adapted to permit the passage of a first gas therethrough, said plurality of tubes being inclined from the vertical whereby the separation of said plurality of tubes with respect to each other and to said vertically extending tube is least at the lower end of said tube;
    (c) a cylindrical hollow housing adapted to receive a second gas and enclosing a section of said first tube and said plurality of tubes, said housing forming passages surrounding the tubes, the first tube and the plurality of tubes at said lower end forming passages between them and communicating with said housing passages for the discharge of said second gas, a high temperature flame being generated proximate the end of said tubes by the ignition of the gases passing from said first tube, said plurality of tubes and said housing; and
    (d) the said surface being positioned below the said lower end of the tubes to receive a deposit of the constituents thereon for crystal growth.

2. Apparatus for flame fusion crystal growth wherein a crystal is grown on a surface by subjecting the constituents of the crystal deposited thereon to a high temperature flame, said apparatus comprising:
    (a) a first vertically extending cylindrical tube adapted to permit the downward passage of oxygen gas therethrough;
    (b) means for feeding oxygen gas through said hollow tube;
    (c) a plurality of cylindrical tubes, said tubes being distributed around said first tube at equidistantly spaced positions relative thereto and adapted to permit the passage of a first gas therethrough, said plurality of tubes being inclined from the vertical whereby the separation of said plurality of tubes with respect to each other and to said vertically extending tube is least at the lower end of said tube;
    (d) means for feeding a first gas through said plurality of tubes;
    (e) a cylindrical hollow housing adapted to receive a second gas and enclosing said first tube and said plurality of tubes, said housing forming passages surrounding the tubes, the first tube and the plurality of tubes at said lower end forming passages between them and communicating with said housing passage for the discharge of said second gas;
    (f) means for feeding a second gas into said housing whereby said second gas is discharged through said passages, a high temperature flame being generated proximate the end of said tubes by the ignition of the gases passing from said first tube, said plurality of tubes and said housing; and
    (g) the said surface being positioned below the said lower end of the tubes to receive a deposit of the constituents thereon for crystal growth.

3. Apparatus for flame fusion crystal growth wherein a crystal is grown on a surface by subjecting the constituents of the crystal deposited thereon to a high temperature flame, said apparatus comprising:
    (a) a first vertically extending cylindrical tube adapted to permit the downward passage of oxygen gas and the crystal constituents therethrough;
    (b) a plurality of cylindrical tubes, said tubes being distributed around said first tube at equidistantly spaced positions relative thereto, said plurality of tubes being inclined from the vertical whereby the separation of said plurality of tubes with respect to each other and to said vertically extending tube is least at the lower end of said tube;
    (c) a cylindrical hollow housing having upper and lower sections adapted to receive a gas from the group consisting of oxygen and hydrogen, one section receiving oxygen and the other section receiving hydrogen, said upper section communicating with said plurality of tubes, said housing enclosing said first tube and said plurality of tubes and forming passages surrounding the tubes, the first tube and the plurality of tubes at said lower end forming passages between them and communicating with said housing passage for the discharge of gas from said lower section;
    (d) means for supplying said gases to said upper and lower sections and said first tube, a high temperature flame being generated proximate the bottom end of said tubes by the ignition of gases passing from said first tube, said plurality of tubes and the lower section of said housing; and
    (e) the said surface being positioned below the said lower end of the tubes to receive a deposit of the constituents thereon for crystal growth.

References Cited by the Examiner

UNITED STATES PATENTS

| | | | |
|---|---|---|---|
| 1,324,866 | 12/1919 | Wilcox | 158—27.4 XR |
| 2,398,884 | 4/1946 | Crowe | 158—27.4 XR |
| 2,435,638 | 2/1948 | Shorter | 158—27.4 XR |
| 2,792,287 | 5/1957 | Moore et al. | 23—202 XR |
| 2,942,941 | 6/1960 | Merker | 23—273 |

OTHER REFERENCES

Lawson et al., Preparation of Single Crystals, pages 29 and 30, Butterworth Pub. 1958.

Rare Earth Research, MacMillan Co. by Kleber Oct. 16, 1961, pages 88 to 93.

NORMAN YUDKOFF, *Primary Examiner.*